United States Patent
Schmittmann et al.

(10) Patent No.: US 11,513,103 B2
(45) Date of Patent: Nov. 29, 2022

(54) PORTABLE GAS ANALYSIS DEVICE WITH COMPACT MEASUREMENT DEVICE

(71) Applicant: bentekk GmbH, Hamburg (DE)

(72) Inventors: Matthias Schmittmann, Hamburg (DE); Johannes Weber, Hamburg (DE); Paul Weber, Berlin (DE); Arne Jünemann, Hamburg (DE)

(73) Assignee: bentekk GmbH, Hamburg (DE)

( * ) Notice: Subject to any disclaimer, the term of this patent is extended or adjusted under 35 U.S.C. 154(b) by 634 days.

(21) Appl. No.: 16/482,938

(22) PCT Filed: Oct. 13, 2017

(86) PCT No.: PCT/EP2017/076235
§ 371 (c)(1),
(2) Date: Aug. 1, 2019

(87) PCT Pub. No.: WO2018/141426
PCT Pub. Date: Aug. 9, 2018

(65) Prior Publication Data
US 2020/0003738 A1 Jan. 2, 2020

(30) Foreign Application Priority Data
Feb. 2, 2017 (DE) .......... 10 2017 201 677.9

(51) Int. Cl.
*G01N 30/60* (2006.01)
*G01N 30/54* (2006.01)
(Continued)

(52) U.S. Cl.
CPC ......... *G01N 30/6043* (2013.01); *G01N 30/30* (2013.01); *G01N 30/54* (2013.01);
(Continued)

(58) Field of Classification Search
None
See application file for complete search history.

(56) References Cited

U.S. PATENT DOCUMENTS

| 4,424,127 A | 1/1984 | Roeraade |
| 5,298,225 A * | 3/1994 | Higdon .................. G01N 30/88 |
| | | 422/89 |

(Continued)

FOREIGN PATENT DOCUMENTS

| CN | 101595385 A | 12/2009 |
| CN | 103424495 A | 12/2013 |

(Continued)

OTHER PUBLICATIONS

Office Action dated Feb. 16, 2018, directed to DE Application No. 102017201677.9; 6 pages.

(Continued)

*Primary Examiner* — Daniel S Larkin
(74) *Attorney, Agent, or Firm* — Morrison & Foerster, LLP

(57) ABSTRACT

A portable gas analysis device having a separating column and a detector. The separating column is composed as a multi-capillary unit from parallel individual capillaries and, depending on the length, is bent into a compact shape, preferably even wound into multiple turns. A thermally conductive casing and a thermal stabilizing device are provided for the multi-capillary unit. The thermal stabilizing device comprises a temperature sensor, a heating element and control electronics. The casing protects the sensitive multi-capillary unit from mechanical actions; it acts as a protective space. The temperature-controlled casing also forms a space in which uniform and controlled conditions prevail and which in particular is isolated from the temperature and humidity of the environment, allowing reliable measurements outside a laboratory environment, in the field.

(Continued)

This double effect of the casing for the capillaries in conjunction with the compact dimensions forms the true essence of the invention.

29 Claims, 7 Drawing Sheets

(51) Int. Cl.
    *G01N 30/30*      (2006.01)
    *G01N 30/62*      (2006.01)
    *G01N 30/00*      (2006.01)
    *G01N 30/02*      (2006.01)

(52) U.S. Cl.
    CPC ......... *G01N 30/6095* (2013.01); *G01N 30/62* (2013.01); *G01N 2030/0095* (2013.01); *G01N 2030/025* (2013.01)

(56) References Cited

U.S. PATENT DOCUMENTS

| | | | | |
|---|---|---|---|---|
| 5,313,061 A | * | 5/1994 | Drew | ............ H01J 49/26 250/296 |
| 5,583,281 A | * | 12/1996 | Yu | ............ G01N 30/6095 73/23.42 |
| 5,856,616 A | | 1/1999 | Maswadeh et al. | |
| 5,983,703 A | | 11/1999 | Wylie | |
| 6,306,200 B1 | * | 10/2001 | Yu | ............ G01N 30/466 73/23.36 |
| 8,506,801 B2 | * | 8/2013 | Burger | ............ G01N 30/6095 95/82 |
| 2006/0283324 A1 | | 12/2006 | Roques | |
| 2008/0185342 A1 | | 8/2008 | Burger et al. | |
| 2014/0260540 A1 | | 9/2014 | O'Neil et al. | |
| 2016/0341695 A1 | | 11/2016 | Zhang | |

FOREIGN PATENT DOCUMENTS

| | | | | |
|---|---|---|---|---|
| CN | 103743919 A | | 4/2014 | |
| DE | 102015219838 | | 4/2017 | |
| EP | 0035983 | | 9/1981 | |
| EP | 0552529 | | 7/1993 | |
| GB | 2318528 | * | 4/1998 | ............ G01N 30/02 |
| WO | 2009/149541 | | 12/2009 | |

OTHER PUBLICATIONS

Office Action dated Jul. 28, 2021, directed to CN 201780089006.2; 13 pages, (translation of search report provided).
International Search Report and Written Opinion dated Jan. 8, 2018, directed to International Application No. PCT/EP2017/076235; 21 pages.

* cited by examiner

PORTABLE GAS ANALYSIS DEVICE WITH COMPACT MEASUREMENT DEVICE

CROSS-REFERENCE TO RELATED APPLICATIONS

This application is a U.S. national stage patent application of International Patent Application No. PCT/EP2017/076235, filed Oct. 13, 2017, which claims the priority of DE 10 2017 201 677.9, filed on Feb. 2, 2017, the entire contents of each of which are incorporated herein by reference.

FIELD OF THE INVENTION

The invention relates to a portable gas analysis device having a measuring unit comprising a separation column and a detector.

BACKGROUND OF THE INVENTION

Gas chromatography is an established measuring method to determine the chemical composition and concentration of volatile materials. In the method, a gas mixture is injected into a column, in which there is a pressure gradient and thus gas flow toward the end, wherein each material propagates at a separate speed in the column and reaches the end of the column after a specific retention time. A signal for the intensity according to retention time, the so-called chromatogram, is plotted using a suitable detector. In this chromatogram, each material has characteristic peaks, on the basis of which this material can be identified and the concentration can be determined. For a successful measurement, it is necessary for these peaks to be sufficiently clearly recognizable and separated from one another. The chromatogram is dependent on many factors, among them the type, length, and temperature of the column and also the pressure gradient. A longer column (or columns arranged in series) stretches the chromatogram and separates the peaks better, but lengthens the measuring process. Columns arranged in parallel (or columns having greater internal diameter) improve the throughput and boost the signal at the detector, whereby lower concentrations can be measured. At higher temperatures and pressures, the method accelerates, wherein there is a limit in each case of the load for the column and also the performance capacity of heater and fans. Uneven temperatures in the course of the column or varying temperatures and pressures in the course of the measurement distort the measurement result and make it more difficult to compare various measurements.

Stationary laboratory devices, which are typically embodied having very long chromatography columns (>10 m) and are operated in complexly controlled external conditions, are known. The device is preheated, calibrated, and flushed in this case. A measurement thus only takes place after a long process of preparation, during which all conditions stabilize. Many laboratories are also climate-controlled, because of which a laboratory device only has to adapt itself to a small span of external temperatures. The power supply from the grid permits heating to be performed inefficiently. Laboratory devices can accordingly measure gases with high sensitivity, selectivity, and precision. They are hardly usable outside a laboratory. They are unsuitable for portable use.

Miniaturized gas chromatographs have been developed for more universal and simpler, possibly also portable, use, which are either embodied as portable devices or are to meet specific specifications on size or costs. In comparison to laboratory devices, these miniaturized gas chromatographs represent a compromise between performance capacity of the measurement and dimensions. For a specific application, a sufficient sensitivity for a specified concentration of a material has to be achieved and a selectivity has to exist between the materials to be expected. Many of the miniaturized gas chromatographs are narrowly developed to a specification, for example, as a portable device in environmental technology, as a measuring device for traces of health-harmful compounds in operational safety, or as an installation in a measuring vehicle. In many of these applications, the device also has to function in the case of extreme external temperatures, is only supplied with power via a battery, and is subjected to stresses due to shaking and impacts. The most compact device class for miniaturized gas chromatographs are those which can be continuously carried in the hand by a person or can be carried on the body. The weight of electronic control units, energy accumulators, and housings is added to the weight of the assembly for the gas chromatography in the narrower meaning.

A portable gas chromatograph was proposed by the applicant (application reference number DE 10 2015 219 838), which weighs approximately 1 kg at a volume of approximately 1 L. This device is the most compact and lightest mobile gas chromatograph (completely functional gas analysis device) on the market by some distance. The components such as fan, filter, various electronic control units, a rechargeable battery, and the various components of the gas chromatograph in the narrower meaning (injection unit, column as multi-capillary, detector unit) are arranged in this device so that they efficiently use the existing space. The device is provided for use in particular in operational safety and with emergency services such as factory fire departments.

A demand exists for improving such a portable gas analysis device with respect to robustness and broader usability even in unfavorable surrounding conditions.

SUMMARY OF THE INVENTION

According to some embodiments, an objective is to provide a portable gas analysis device improved in this manner.

In a portable gas analysis device, in particular for highly volatile compounds, having a gas measuring path which comprises a separation column having a detector as a measuring unit, it is provided according to some embodiments of the invention that the separation column is embodied as a multi-capillary unit composed of individual capillaries arranged in parallel and, depending on the length, bent into a compact shape, preferably even wound in multiple turns, and a casing is provided for this multi-capillary unit, wherein the casing consists of a material having good thermal conductivity, in particular metallic material, and has a thermal stabilization unit, which comprises a temperature sensor and a heating element on the casing.

According to some embodiments, the invention is based on the concept, using the casing enclosing the capillaries, which are thin and fragile per se, of combining a good mechanical protection with functional advantages with respect to stabilization and greater tolerance in relation to difficult surrounding conditions.

The casing, on the one hand, effectuates a high level of protection of the sensitive multi-capillary against mechanical effects. The capillaries are comparable to thin glass fibers and can easily break at a bending point or can break out of a holder at the ends thereof. The casing thus functions as a protective space, in which the curvature of the capillaries is predefined, which are assembled as a bundle and are fixedly enclosed in the robust material of the casing. By the temperature-regulated casing directly enclosing the capillaries, which are bent or wound into multiple turns, on the other hand, it forms a space in which uniform and monitored conditions prevail, which is separated in particular from the temperature and humidity of the surroundings. It thus also functions as a controlled space, similar to a laboratory, but in a much smaller scale. This double action of the casing for the capillaries forms the actual core of the invention. The invention thus enables the opposing challenges with respect to greater robustness to be unified with broader, in particular portable usability. Unifying these in one portable device is a particular merit of the invention, of which there is no example in the prior art.

"Good thermal conductivity" is understood as a material in the present case which has a coefficient of thermal conductivity of at least 10 W/(m*K).

Multiple heating elements are expediently provided and are arranged on the casing so that the multi-capillary unit is homogeneously temperature-controlled. Thanks to the heating elements thus claimed, the thermal conditions in the measuring device are thus controlled better, in particular the temperature of the temperature-sensitive multi-capillary unit having its capillaries which are bent or wound in turns can be kept substantially constant. In this manner, inaccuracies and undesired effects due to temperatures which vary or change during the measuring process can be minimized. Due to the arrangement of the heating elements distributed on the casing itself, a targeted action furthermore results, so that the desired temperature can be set and maintained using a minimum of energy. The frugal energy use is particularly favorable for the portable application of the portable gas analysis device, also with respect to a preferably intrinsically-safe embodiment, in which the electrical power has to be limited. The arrangement of multiple heating elements furthermore offers the advantage that a redundancy is achieved with respect to the failure of individual heating elements. The reliability of the portable gas analysis device in operation is thus enhanced.

The multi-capillary unit is preferably anchored using a heat-conductive holding means in the casing, in particular by means of a heat-conductive adhesive means, which preferably fills up the cavity in the casing around the multi-capillary unit. On the one hand, a better mechanical protective effect is achieved using this anchoring, since undesired and possibly harmful movements of the capillaries inside the casing are avoided in this manner. It is ensured by the heat-conductive embodiment of the adhesive means that the multi-capillary unit is thermally coupled to its casing. Since the casing itself consists of a heat-conductive material according to the invention, this ensures a good heat transfer to the capillaries and a homogeneous temperature at the capillaries themselves.

The casing is preferably embodied so that it encloses the multi-capillary unit and does so both on the inside and on the outside. In particular, it is expedient if the casing encloses the capillaries, which are wound in multiple turns, in a ring shape on both sides. A mechanical protection of the multi-capillary unit is achieved and, on the other hand, the temperature control of the multi-capillary unit is achieved in a functional aspect in a particularly compact and also reliable manner. The ring-shaped design enables a particularly compact and robust embodiment. Furthermore, it can preferably be provided that further components of the portable gas analysis device are arranged in an interior of the ring, whereby the space in the interior of the portable measuring device is used efficiently.

One expedient design of the casing is if it is formed trough-like in cross section and is closed by a removable cover. The trough-like design enables a position-securing accommodation of the multi-capillary unit. The trough-like design furthermore offers the advantage that the multi-capillary unit can be inserted directly from above. The risk of damage to the sensitive capillaries is thus minimized. The handling during the assembly and repairs is thus substantially simplified. The capillaries wound in multiple turns are reliably prevented from falling out by the cover. Furthermore, the cover, which is also heat-conductive, promotes the maintenance of constant temperature conditions in the thus enclosed space for the multi-capillary unit.

The casing is advantageously enclosed with thermally insulating material. In this manner, heat losses of the casing can be reduced. The energy required for the temperature control of the casing and the multi-capillary located therein is minimized in this manner. The lower power consumption has the result that smaller and more compact energy accumulators (rechargeable batteries) can be used. This is favorable for the robustness of the gas analysis device, on the one hand, and also facilitates the mobile use by avoiding unnecessary weight, on the other hand.

The casing is expediently provided with a common connector block (referred to hereafter as a multi-connector block). The connector block combines the connection of the capillaries and the connection of the supply lines and exhaust lines for the capillaries. Furthermore, the multi-connector block terminates the access to the cavity, in which the capillaries wound in multiple turns are arranged in the casing, to the outside, which results in a further improvement with respect to temperature control and thermal insulation. The combination into a multi-connector block not only enhances the compactness, but rather furthermore offers the advantage of great robustness. It has been shown that especially the multi-connector block and in particular its connection to the capillaries can be of decisive significance for the robustness. The sensitive capillaries are thus optimally protected both in the casing per se and also by the connection thereof to the multi-connector block. The multi-connector block preferably also consists of heat-conductive material. It therefore also participates in the temperature control in a manner corresponding to the casing. This promotes a homogeneous temperature distribution in the casing and on the multi-capillary unit. The multi-connector block preferably has external connections and internal connections. The internal connections are those for the separation column embodied as the multi-capillary unit. The external connections are understood as those for carrier gas supply line, sample gas supply line, gas exhaust line, and possible connections for the exhaust of dead volumes.

The thermal stabilization unit is expediently designed so that the temperature in the casing is greater than the ambient temperature, and preferably reaches a predefined constant value which is greater than an expectable highest temperature in the area of use, for example, 50° C. By the temperature being kept constant in the compact connected overall analytic path of the measuring unit, from the sample connection through the separation column to the detector at the end of the separation column, and also from measurement to measurement, a stabilization and high level of comparability of the processes in the measuring unit can be achieved in conjunction with a low power consumption.

A receptacle for the detector of the gas chromatograph is advantageously also arranged on the common connector block, in the analytical gas path after the separation column. Maintaining homogeneous temperature conditions is thus significantly improved. A particularly compact and robust embodiment thus results, which thermally connects the detector to the common connector block, the casing, and thus finally also to the multi-capillary. Since the gas paths are provided in any case on the common connector block, in this manner a connection of the detector can be achieved without additional lines being required. This not only simplifies the production, but rather also enhances the reliability and the robustness due to the avoidance of unnecessary line connections. Moreover, a thermally favorable connection is ensured by the direct accommodation. The detector is preferably embodied as a photoionization detector, mass spectrometer, thermal conductivity detector, and/or semiconductor gas detector.

The common connector block is advantageously embodied in two parts to save material and to be able to position the ends of the multi-capillary unit independently. In this case, the beginning of the capillaries wound in multiple turns is arranged on a first part of the connector block and the end of the capillaries is arranged on a second part of the connector block. In this manner, a functional allocation can be achieved between the two parts. The two parts of the connector block can be arranged on the same side or on different sides, in particular opposing sides, of the casing.

A separate seeker detector is preferably provided, which is arranged in the gas path before the beginning of the multi-capillary unit. Using such a second detector, the presence of chemical compounds in the sample can be established before the sample is injected into the separation column, whereby suitable measuring points can be searched for using the portable gas measuring device. A search mode can thus be carried out in parallel to the actual measuring mode. For this purpose, the seeker detector is expediently arranged on the first part of the connector block, which has a corresponding receptacle for this purpose. A direct connection of the seeker detector to the gas inlet is thus enabled in a simple manner. A rapid response of the seeker detector can thus be achieved.

Furthermore, it is advantageously provided for flushing the seeker detector that one gas path leads from an inlet of the sample gas on the housing of the portable gas analysis device to the seeker detector and a second gas path leads from the same inlet through the separation column up to the detector, wherein the switching of a valve determines whether in a first mode, a part of the second gas path in the common connector block has flow through it during the injection in the direction of the separation column or in a second mode, flushing is performed in the opposite direction using carrier gas filtered in a filter.

The portable gas analysis device expediently furthermore comprises an electrical energy accumulator, which is designed for the autonomous supply of the thermal stabilization unit. Thanks to the arrangement of the capillaries embodied according to the invention in a casing as a heat accumulator, the energy consumption is minimized, so that a supply of the thermal stabilization unit by means of an installed electrical energy accumulator is enabled. The usability of the portable gas analysis device in the field test can thus be significantly enhanced. An outstandingly space-saving construction is thus enabled. According to one particularly advantageous embodiment of the invention, the entire measuring unit having the multi-capillary is embodied compactly, and preferably has a volume of at most 0.5 L, more preferably at most 0.25 L. Thanks to such a spatially small embodiment, a small load is achieved for the user in mobile use, since the gas measuring device can be continuously carried in the hand or on the body. The electrical energy accumulator and the casing are expediently arranged in a stacked configuration, wherein preferably the electrical energy accumulator is arranged on top (in relation to the normal operating location of the portable gas analysis device according to the invention). The electrical energy accumulator thus additionally assists the temperature control of the multi-capillary unit because of its intrinsic heating.

The measuring unit, in particular the electronics unit of the temperature stabilization unit and the detectors, is expediently embodied so that no risk of ignition due to strong heat development or sparking can arise, for example, in the event of short-circuits. Power limiting of all electronic components and the embodiment in redundancies in parallel and serial multiple structures substantially reduce the probability of failures and short-circuits and in the event of malfunctions result in the failure of the function without power spikes, strong heat development, or the like. In this manner, endangerment of the intrinsic safety of the portable gas analysis device, in particular of inductive components and the potentials thus induced of electrical spark discharges, is minimized. In particular, the measuring unit, in particular the control electronics unit of the thermal stabilization unit, is embodied so that to avoid undesired energy transfer, in particular due to interference or electric arcs, minimum distances are maintained between electrical grids, the electrical power at components is limited to avoid an impermissibly high surface temperature, and safety-relevant components are embodied redundantly or multiple times to avoid critical failures or short-circuits. Independently thereof, the portable gas analysis device is preferably embodied as explosion-protected. This means that it is designed in particular as intrinsically safe. This applies in particular with respect to limiting of the energy reserve, which is promoted by the energy-saving design according to the invention. Furthermore, intrinsically safe means that minimum distances of components and contacts are maintained. Not only is a greater level of protection of the user achieved by ensuring the intrinsic safety, but rather also an approval as "explosion-protected" is enabled. The spectrum of use is thus further expanded. The attributes "explosion protected" and/or "intrinsically safe" are technical terms, which are known to the relevant person skilled in the art here and are exactly specified in relevant norms and certificates; they therefore do not require further explanation.

The measuring unit comprising the separation column and the detector is expediently embodied as an independent, replaceable assembly. In this manner, a simple replacement can be enabled in the event of defect or maintenance. The service friendliness of the portable gas analysis device is thus enhanced. The measuring devices may also be refitted and/or optimized for specific applications by the replacement of preassembled measuring units having different materials of the capillaries and/or lengths of the separation column.

Some advantages of various aspects of the invention may be summarized as follows: According to some embodiments, an improved transportable gas analysis device is provided, which may additionally be certified as intrinsically safe for the explosion protection. The requirements for the intrinsic safety of the transportable gas analysis device and also the requirement of being able to operate it for a longer time without external power supply demand a limited power consumption by the heating units. At the same time, a specific temperature greater than the external temperature has to be achieved in the assembly for the gas chromatography, for example, 50° C. even in the case of 0° C. external temperature. The gas paths in the measuring unit, in particular the separation column, therefore have to be heated as efficiently as possible, to ensure a sufficient battery runtime of, for example, at least four hours. In the arrangement according to aspects of the invention, this is carried out by a compact composite of components in the interior, which are heated in a controlled manner by applied heating elements, whereby a heat-conductive casing encloses the separation column embodied as a multi-capillary unit and the gas paths at the ends of the multi-capillary unit are enclosed in one single or two separate multi-connector blocks and this heat-conductive inner composite is thermally insulated and mechanically protected to the outside by a further layer. The analytic gas path from the sample inlet up to a detector connected via a connector block at the outlet of the multi-capillary is also part of the heated composite. The circuit board having the heating elements and temperature sensors can advantageously also be installed jointly connected in an electronic control loop inside the insulation. The selection of a specific specification for the separation column and the detector decisively determines for which materials the measuring device is suitable and/or optimized. Installing these components in a compact assembly therefore enables a facilitated replacement in the event of repair and refitting by the producer, by replacing the entire assembly.

In comparison to the prior art, in particular the prior solution of the applicant, the invention, according to some embodiments, achieves a more compact and robust measuring unit, a longer usage duration of the portable gas measuring device, better comparable measurement results independently of the ambient temperatures (for example, from −10° C. to 40° C.), and moreover certification and use as an intrinsically safe device for the use in facilities having risk of explosion. The reproducibility of measurements is significantly improved, also between two devices from a series, whereby the archiving and the meta-analysis of successive measurements is improved, in particular if a user employs multiple structurally-identical devices over a longer period of time. Fulfilling these more demanding specifications simultaneously is the merit of the invention, the core of which is the embodiment of the measuring unit as a compact assembly, which is more efficiently heatable and more mechanically robust and, in an advantageous embodiment, is intrinsically safe.

According to some embodiments, the invention furthermore relates to a corresponding measuring unit for a portable gas analysis device as an assembly. Reference is made to the above description for more detailed explanation.

BRIEF DESCRIPTION OF THE DRAWINGS

The invention will be explained in greater detail hereafter with reference to the appended drawing. In the figures.

DETAILED DESCRIPTION OF THE INVENTION

Figure 1:
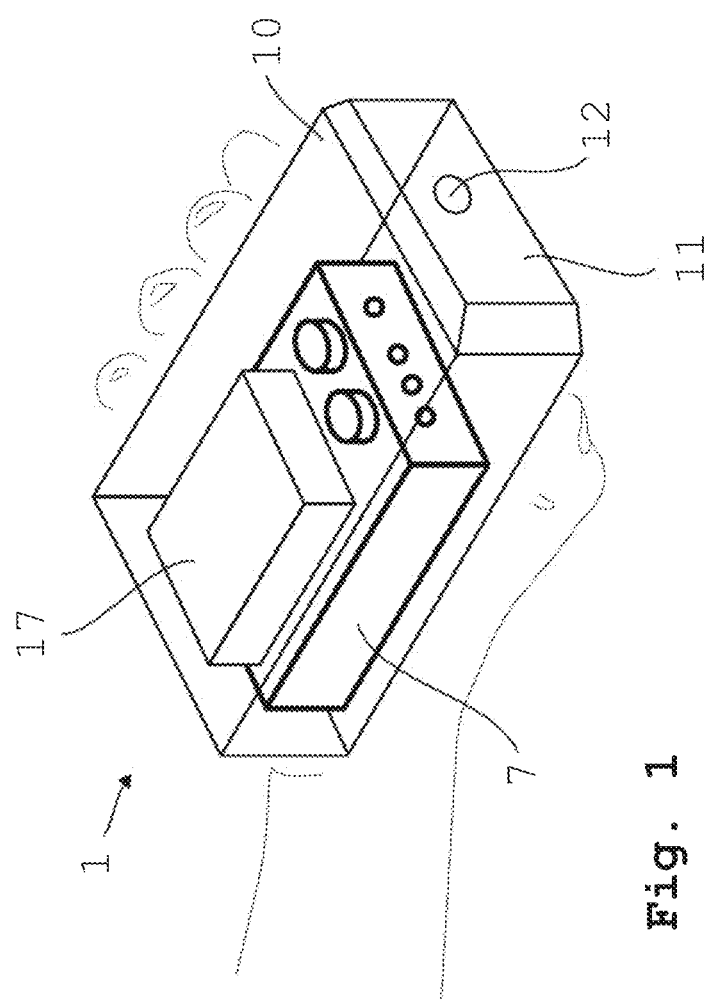
FIG. 1 shows a perspective view of a portable gas analysis device.

A portable gas analysis device identified in its entirety with the reference sign 1 has a housing 10, on the end face 11 of which an inlet 12 for a sample gas supply is arranged. A measuring unit 7 and an electrical energy accumulator 17 are arranged in the interior of the housing 10.

The measuring unit 7 comprises a separation column 3 (see FIGS. 2a, b) and a detector 8 and an optional seeker detector 81. Multiple openings are arranged on an end face of the measuring unit 7, which are used for the supply or exhaust, respectively, of sample gas and/or carrier gas, as will be explained in greater detail hereafter. The gas lines per se are not shown for reasons of comprehensibility.

To illustrate the size ratios, in FIG. 1 the exemplary embodiment of the portable gas analysis device 1 is illustrated in relation to the hand of a user.

Figure 2A:
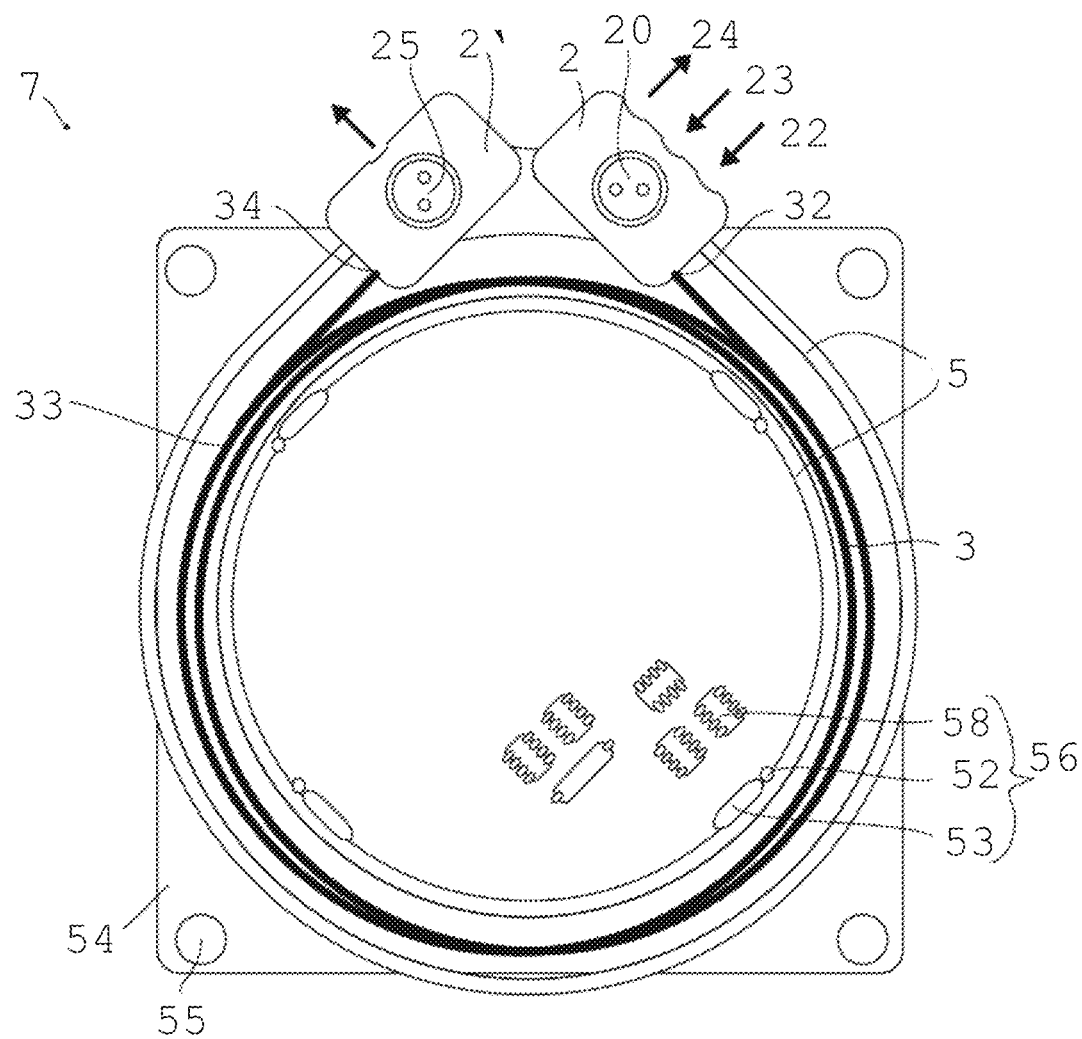
FIGS. 2a and 2b show a top view and mirrored cross-sectional view, respectively, of the measuring unit according to a first exemplary embodiment.
Figure 2B:
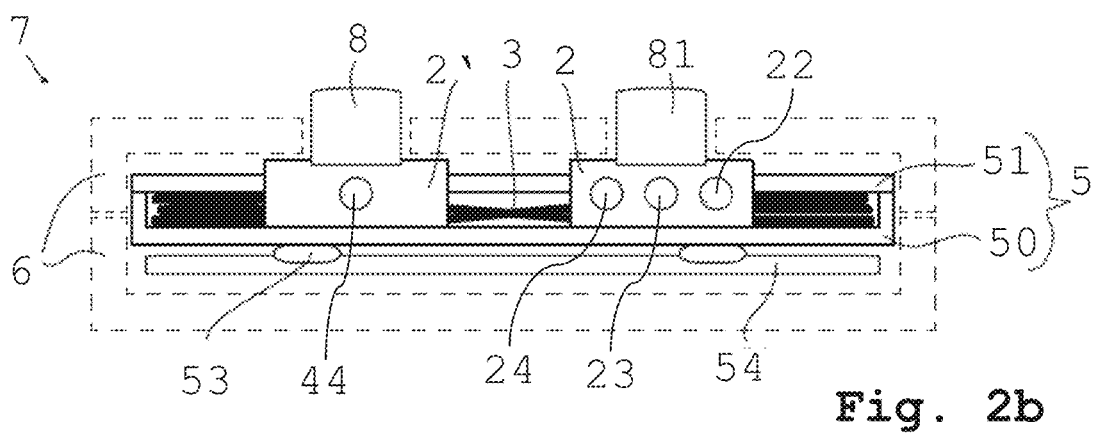

Reference is now made to FIGS. 2a, b and the first exemplary embodiment of the invention illustrated therein. In this embodiment, a multi-connector block is embodied in a two-part variant, which parts are identified in the present case by the reference signs 2 and 2'. The first part 2 of the multi-connector block is designed for the gas supply (injection) and for searching (provided with a seeker detector 81), and the second part 2' is designed for the actual measurement (provided with a detector 8). The two parts 2, 2' of the connector block are connected at both ends to a multi-capillary 3 wound in multiple turns. The first part 2 of the connector block (injection block) has two lateral inlets for gas paths, one 22 for the sample and one 23 for a carrier gas, and a lateral outlet 24 for an exhaust air path of the seeker detector 81. A second receptacle 21 for the seeker detector 81 is provided on the upper side of the injection block 2, in the example a photoionization detector, which is attached using a seal (not shown). A beginning 32 of the multi-capillary 3, which is wound multiple times (wound in multiple turns—winding region 33) is fastened on one side of the injection block 2. The multi-capillary 3 is fastened with its end 34 on the part 2' of the connector block (detection block), which has a lateral connection 25 for an outlet gas path and has a receptacle 20 for a detector 8 on the upper side, in the example also a photoionization detector. Both parts of the connector block, i.e., the injection block 2 and the detection block 2', are manufactured from a heat-conductive and chemically-inert material, from polished stainless steel here. The multi-capillary 3 is enclosed in a ring-shaped and U-shaped profile 50 made of aluminum as a casing 5, which is terminated by a cover 51 made of aluminum. The interior of the profile 50 around the multi-capillary 3 can be filled up using a heat-conductive adhesive. The profile 50 is connected to a circuit board 54, on which a control electronics unit 58 of a thermal stabilization unit 56 is attached, wherein the heating elements 53 and temperature sensors 52 are each attached as resistors to the circuit board 54 below the profile 50. The control electronics unit 58 is embodied so that it meets the requirements for the certification of intrinsic safety. The circuit board 54 having the thermal stabilization unit 56 is also used as a main circuit board, on which all other components can be built up vertically. The casing 5 is enclosed on all sides by a thermally insulating layer 6 made of foam, which also absorbs impact energy. In the example, the rear sides of the detectors 8, 81 protrude out of the insulation 6. In this embodiment, the two parts 2, 2' of the connector block are attached jointly on one side, to connect them to further gas paths (not shown). Boreholes 55 in the circuit board 54 are provided to fasten the measuring unit 7 in the housing 10.

Figure 8:
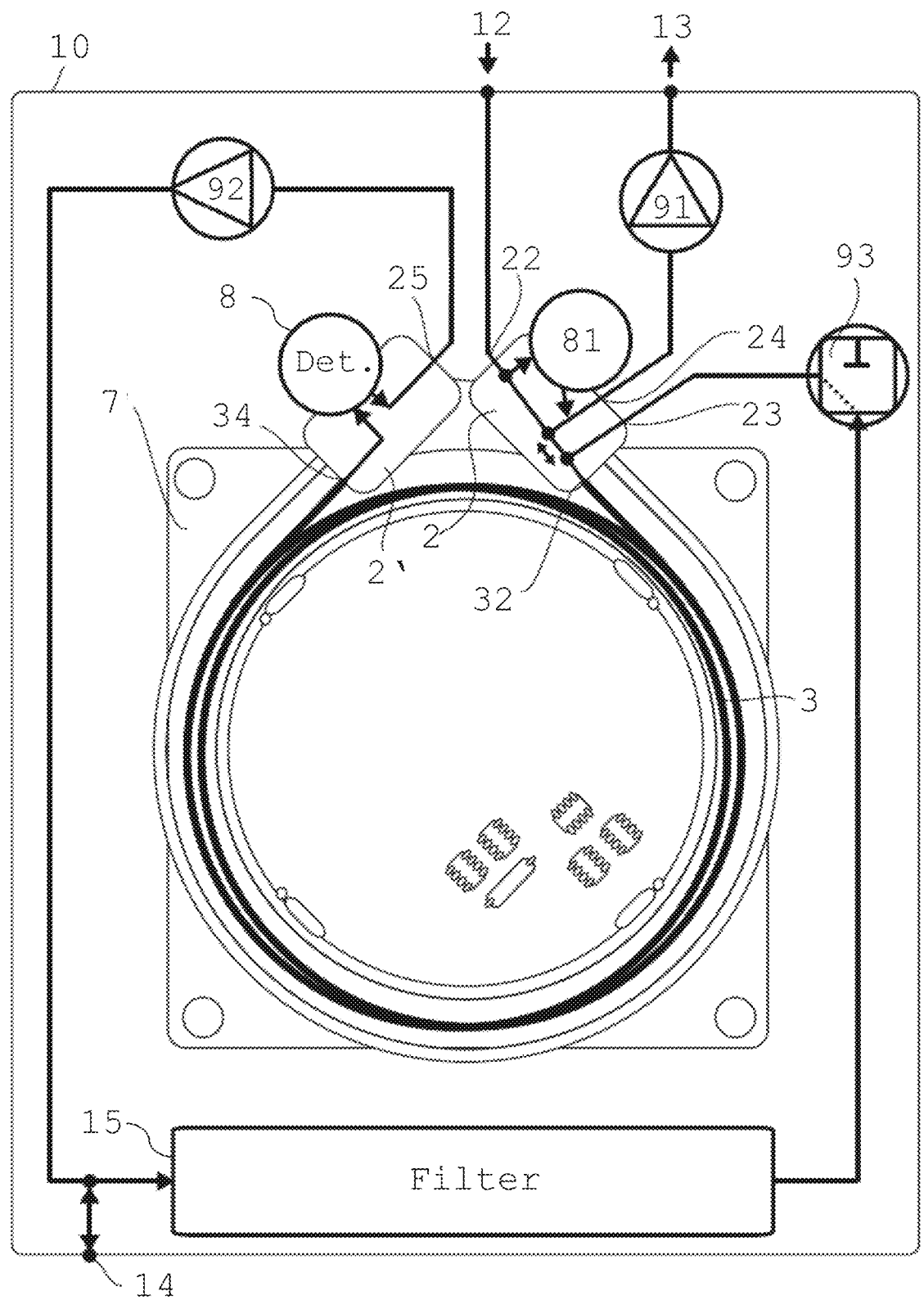
FIG. 8 shows a supplementary top view or cross-sectional view of the first exemplary embodiment.

The gas paths originate from the connections of the measuring unit described in the first exemplary embodiment and the function thereof in the portable gas measuring device will be explained in greater detail with reference to FIG. 8. The measuring unit 7 is enclosed in the housing 10, which in this embodiment has an inlet 12, an outlet 13, and a combined carrier gas inlet and second outlet 14. In this exemplary embodiment, the carrier gas is air, which is processed in a filter 15, before the carrier gas is introduced at the intake 23 of the injection block 2. The gas flow in the gas paths, the direction of which is identified by arrows in FIG. 8, is generated by two continuously operated fan units 91, 92. A first gas path guides the sample gas from the inlet 12 via the inlet 22 into the injection block 2, through the seeker detector 81, via the outlet 24 into the first fan unit 91 and at the outlet 13 back out of the housing 10. A second gas path also begins at the inlet 12 of the sample gas, also leads at the inlet 22 in the injection block, but then leads through the separation column 32, 3, 34 up to the detection block 2' through the detector 8 in the outlet 25 to the second fan unit 92. A gas circuit closes the path from the outlet 25 at the detector block 2' through the second fan unit 91 through the filter 15 and a valve 93 back via the intake 23 of the carrier gas into the injection block 2, wherein gas is passively let in or let out at a point 14 before the filter to balance the gas volume. Two operating modes are enabled by the position of a valve 93. The first gas path through the seeker detector 81 is unaffected by the valve position. The above-described second gas path from the inlet of the sample 12 to the detector 8 is only produced if the valve 93 is blocked, i.e., no gas flow arrives at the intake 23 of the injection block 2 (first mode). If the valve 93 is open, the carrier gas flushes from the intake 23 to the outlet 24 in the injection block 2 and does not permit gas flow from the intake 22 of the sample gas into the separation column 3 and further to the detector 8 (second mode). Instead, with open valve 93, the separation column 3 and the detector 8 are flushed using carrier gas, which is filtered in the filter 15 and flows along a circuit, wherein additional volume is incorporated at the inlet 14. This method having two operating modes and the reversal of the gas flow in the injection block is disclosed by the applicant in an earlier application (application reference number DE 10 2015 219 838).

Figure 3A:
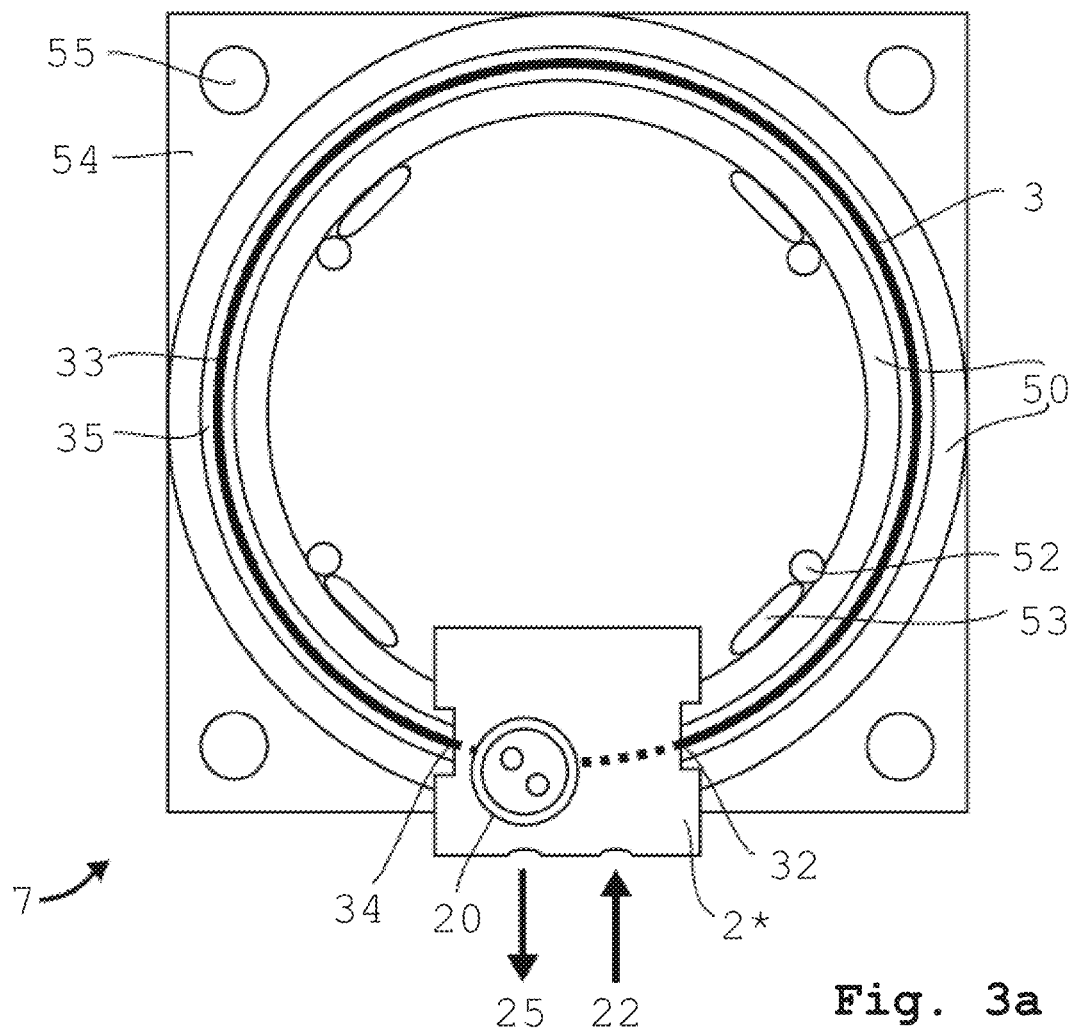
FIGS. 3a and 3b show a top view and cross-sectional view, respectively, of the measuring unit according to a second exemplary embodiment.
Figure 3B:
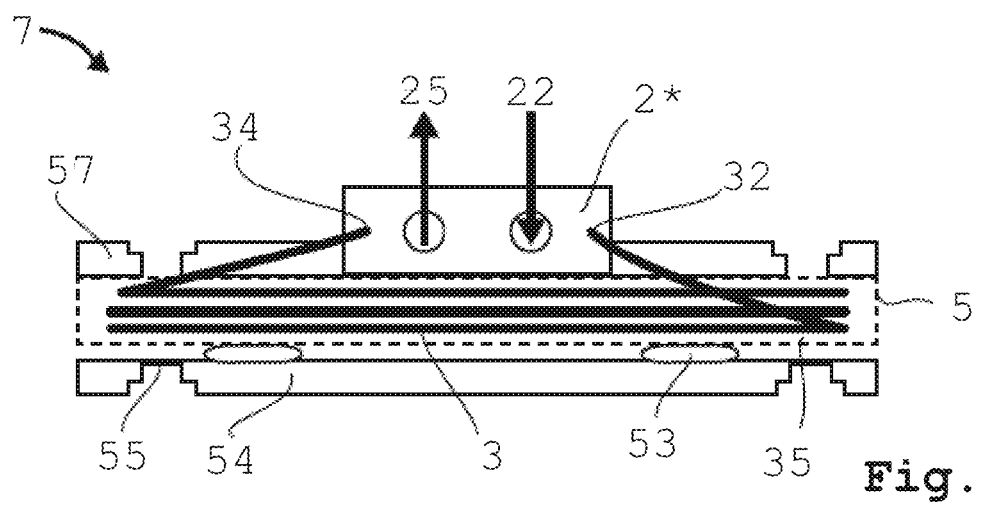

A second exemplary embodiment, illustrated in FIGS. 3*a*, *b*, consists of a simpler embodiment. It substantially corresponds to the first exemplary embodiment illustrated in FIGS. 2*a*, *b*, wherein equivalent components bear the same reference signs. The difference is essentially that in the second exemplary embodiment, only a one-part connector block 2* is provided for gas intake, gas outlet, and detector connection. In this embodiment, a counter circuit board 57 is installed on the upper side of the casing 5 which, like the (main) circuit board 54, also has boreholes 55, so that the composite can be compressed using screws (not shown) to improve the heat coupling. Otherwise, reference is made to the description of the first exemplary embodiment. In this embodiment, in contrast to the first exemplary embodiment, neither a seeker detector nor a gas path system is embodied at the sample inlet. A mixing with carrier gas or an upstream seeker could be externally provided in this embodiment, but not integrated into the assembly of the measuring unit. While the connector blocks in the first (and fifth) exemplary embodiment are installed flatly in a plane with the casing, the connector block 2* in this exemplary embodiment, and also in the next two exemplary embodiments, is arranged on the upper side of the casing. The assembly thus becomes higher, but also shorter. Moreover, the shape of the casing can be selected as a perfect circle, preferably having the maximum permissible curvature of the capillary. The ends 32, 34 of the multi-capillary unit 3 lead upward in the connector block 2*. A casing thus formed made of metal is particularly simple to manufacture. In the first four exemplary embodiments, the heating elements 53 and temperature sensors 52 are depicted on the inside on the casing 5 in the top view for reasons of illustration, but they are preferably placed underneath, directly on the circuit board 54 (as shown in the respective cross section), since this is a particularly stable type of the attachment, in which no further wiring is necessary and the heating elements 53 are enclosed between the heat-conductive casing 5 and the comparatively insulating circuit board 54, whereby a higher degree of efficiency is achieved in the heating of the casing.

Figure 4A:
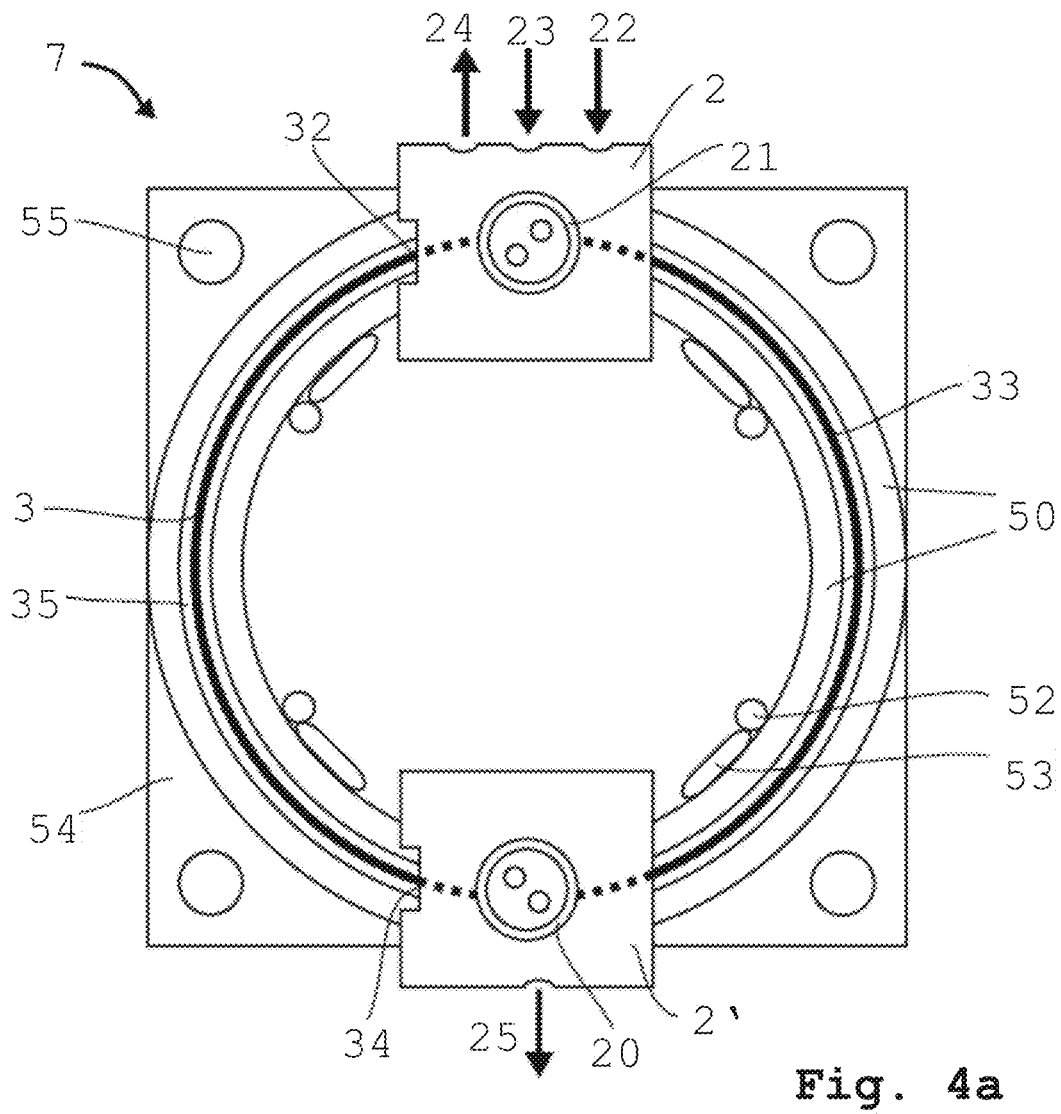
FIGS. 4a and 4b show a top view and cross-sectional view, respectively, of the measuring unit according to a third exemplary embodiment.
Figure 4B:
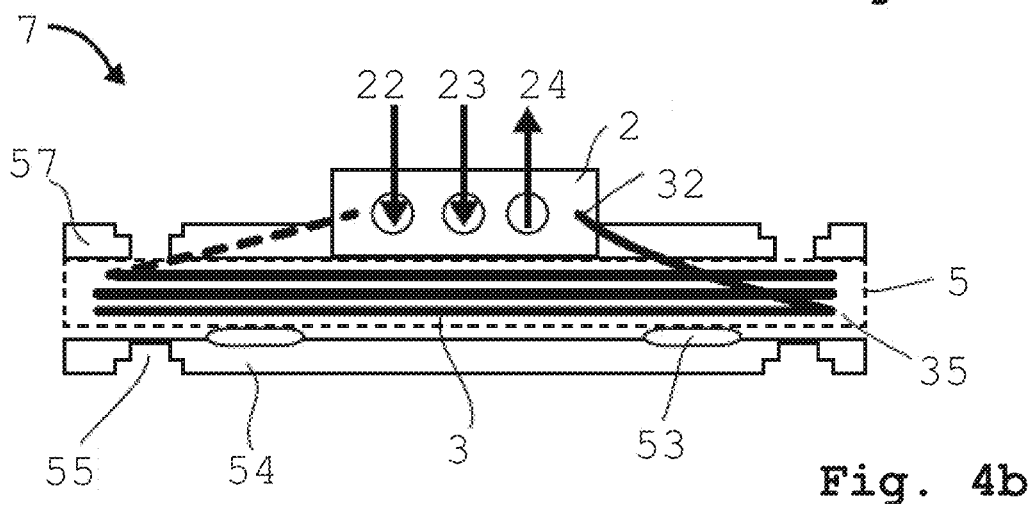

A third exemplary embodiment, shown in FIGS. 4*a*, *b*, displays an arrangement similar to the first (in the function) and the second (in the form) exemplary embodiment. It differs therefrom essentially in that in this case the connections of the first exemplary embodiment are used, wherein the two parts 2, 2' of the connector block are arranged opposing. Otherwise, reference is made to the description of the two preceding exemplary embodiments.

Figure 5A:
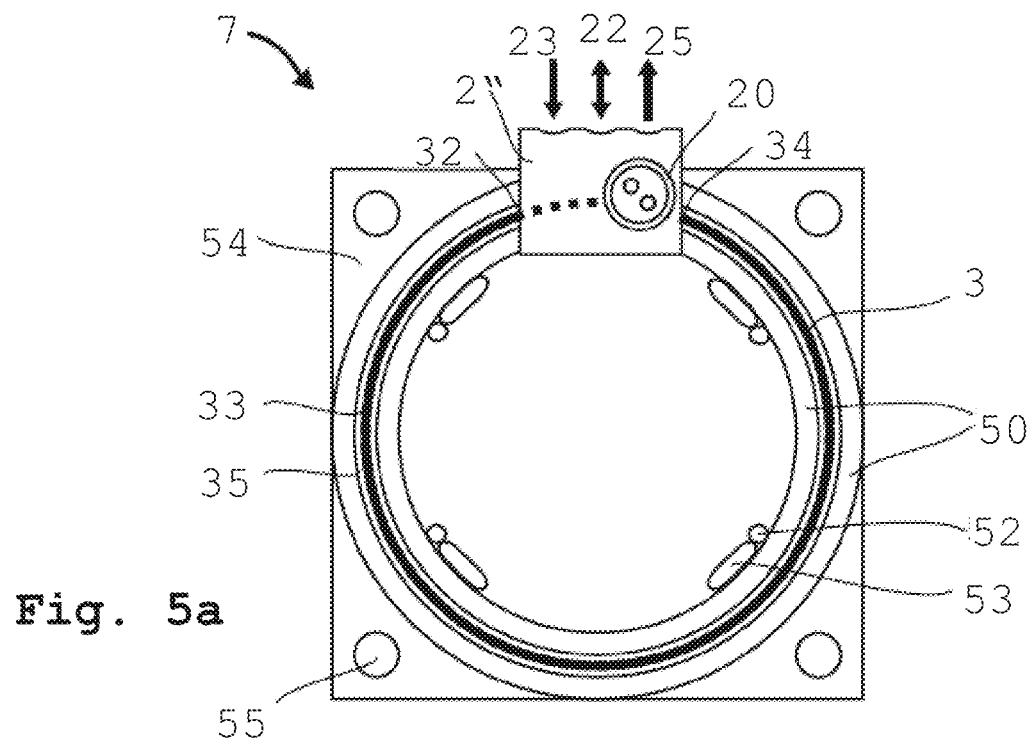
FIGS. 5a and 5b show a top view and cross-sectional view, respectively, of the measuring unit according to a fourth exemplary embodiment.
Figure 5B:
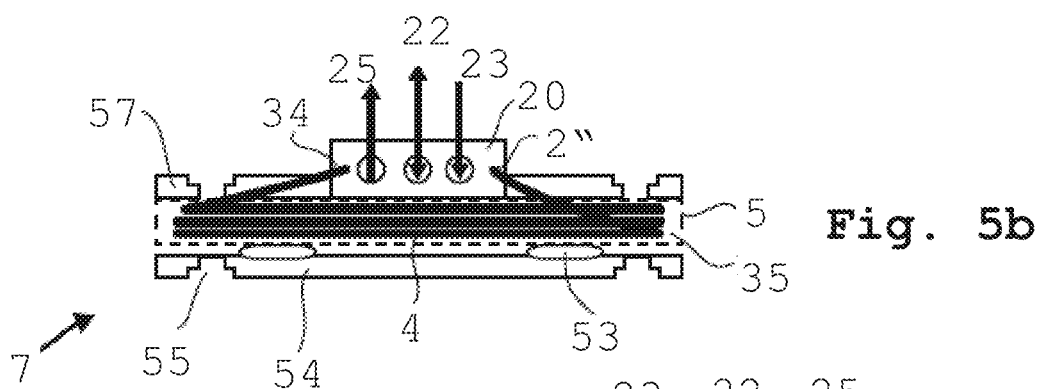

A fourth exemplary embodiment, shown in FIGS. 5*a*, *b*, displays a variant based on the second exemplary embodiment and comprising a one-part connector block having integrated injection and detection block 2" on one side. It has an intake 23 for carrier gas on one side, a corresponding outlet 25, and an intake and outlet 22 for connection to a seeker. The beginning 32 of the capillary 3 is connected to a lateral face of the integrated injection and detection block 2", and the end 34 of the capillary 3 is connected on the opposing lateral face and is internally connected to the outlet 25 and to a receptacle 20 for the detector 8.

Figure 6:
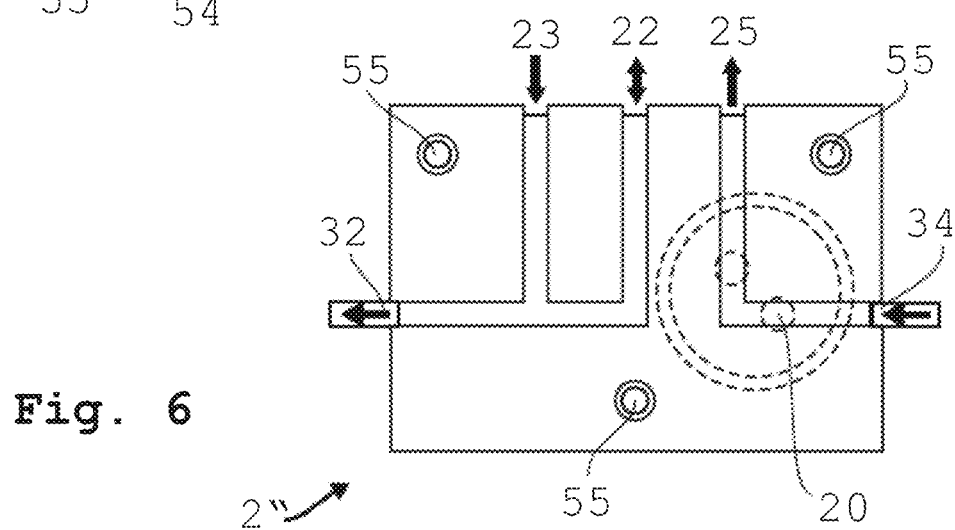
FIG. 6 shows a longitudinal section through a connector block of the fourth exemplary embodiment.

The inner gas paths are shown in FIG. 6 as an exemplary embodiment of the integrated injection and detection block 2". The sample inlet 22 is embodied according to the counter flow principle, which is controlled by a second inlet of carrier gas, wherein the gas flow is only oriented into the block 2" during the injection and in a second mode the gas flows from the block 2" in the opposite direction, preferably into an external seeker (not shown). A suction to exhaust air (generated by an external fan (not shown)) exists in both modes, whereby an oriented gas flow exists from the beginning 32 through the capillary 3 to its end 34. During the injection, the carrier gas supply flow is interrupted (or reduced) in 23 and the sample volume is thus injected into the inlet 22 (and possibly mixed with a component of carrier gas). In contrast, in a second mode more carrier gas is introduced in 23 than is suctioned out at the outlet 25, whereby no sample is injected, on the one hand, but rather carrier gas is blown out at the sample inlet and the multi-capillary 3 is flushed using carrier gas, on the other hand. Such a procedure is not claimed in this application and is only described here for better comprehension of the multiple connections. Many embodiments of connections and gas paths for sample preparation, mixing, enrichment, etc. are conceivable, which can advantageously be integrated into the connector block because of its temperature control.

Figure 7A:
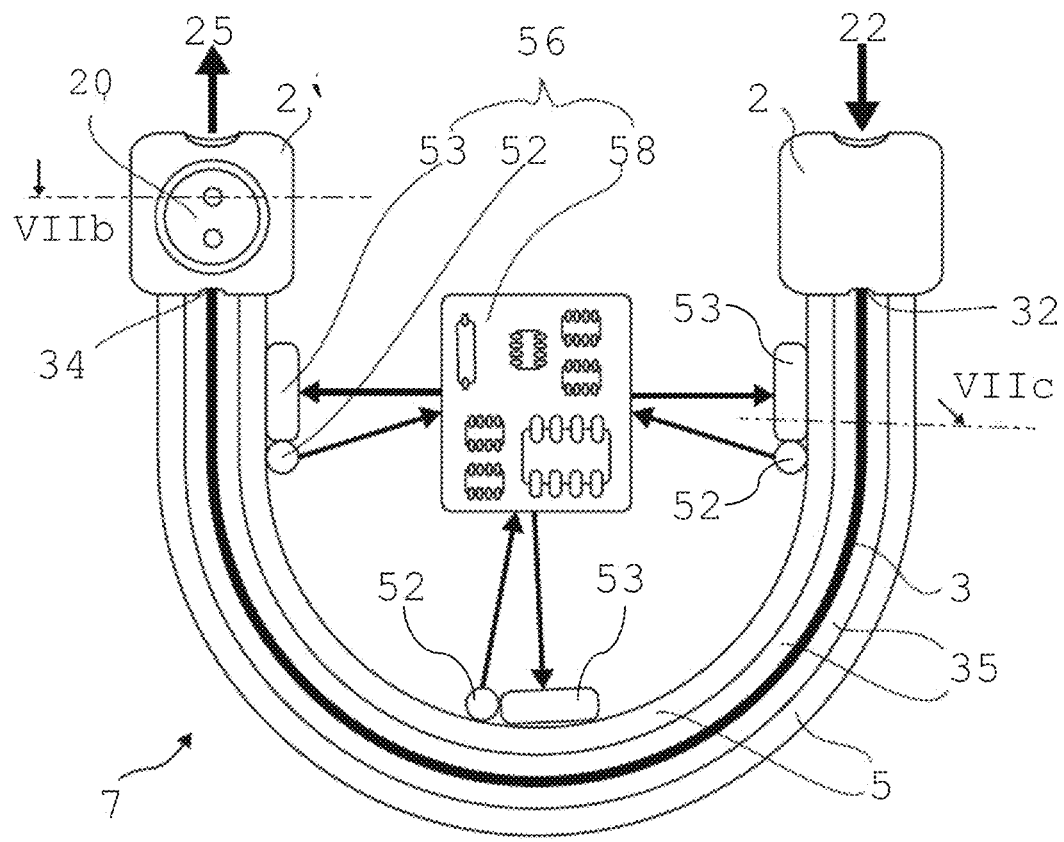
FIGS. 7a, 7b, and 7c show a top view with two detail views in cross section of a compact measuring unit having short separation column without multiple turns according to a fifth exemplary embodiment.
Figure 7B:
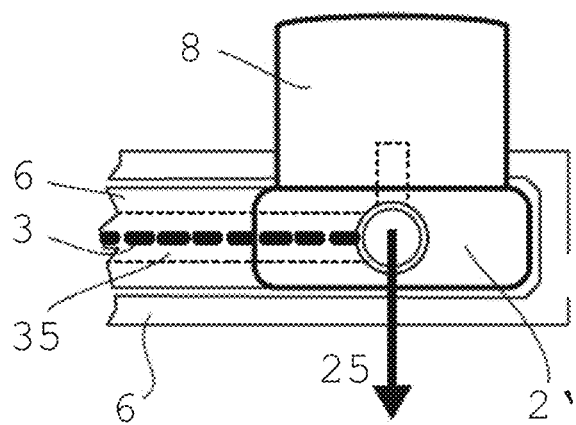
Figure 7C:
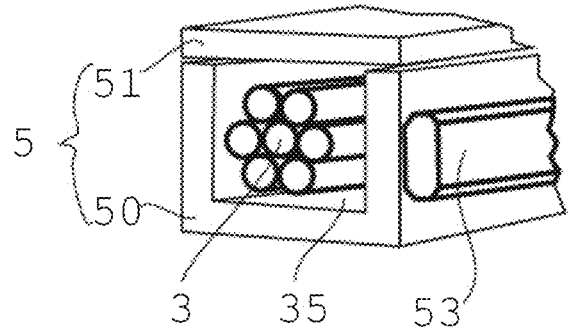

A fifth exemplary embodiment, shown in FIGS. 7a, b, c, differs from the preceding exemplary embodiments due to an even shorter separation column, wherein the multi-capillary unit 3 is not wound multiple times, but rather is bent in a single ring. A shorter capillary permits shorter measuring times, wherein sensitivity and selectivity of the measurement are lost in exchange. In the example, the separation column is approximately 10 cm long and, as shown in FIG. 7c, is composed of seven parallel individual capillaries. For comparison, in the other exemplary embodiments, the multi-capillary units 3 having more than 10 capillary strands of 1 m each are selected, wherein with a specified shape of the casings, full turns of approximately 10 cm can each be selected as additions or subtractions. While a measurement is possible in under one minute with 1 m separation column in the other exemplary embodiments, a measurement is feasible in 10 seconds in the fifth exemplary embodiment. Moreover, in the fifth exemplary embodiment, the entire assembly is embodied flatter, since the casing 5 is not installed on a circuit board, but rather the control electronics unit 58 for a control loop of the thermal stabilization unit 56 (furthermore comprising the temperature sensor 52 and the heating elements 53) is arranged in the interior of the assembly. Various components are shown around a microcontroller by way of example as the control electronics unit 58. In this exemplary embodiment, as in the second exemplary embodiment, only the required external connections for intake 22 and outlet 25 of the gas path are provided, wherein the beginning of the multi-capillary unit 32 is fixedly connected in a passive connector block 2 and the end 34 is accordingly fixedly connected in the connector block 2', on which a photoionization detector 8 (shown in FIG. 7b) is placed over a detector connection 20 (shown in FIG. 7a). Only the detector protrudes out of a foam insulation 6 (in FIG. 7b), which otherwise completely terminates the assembly. It is clear from the three views of FIG. 7 that the capillaries are assembled as a bundle in the multi-capillary unit 3, which is inserted, enclosed by a heat-conductive adhesive means 35, into a trough profile 50 made of aluminum, which forms the closed casing 5 together with a cover 51 made of aluminum. The casing and the connector blocks made of stainless steel have a similar height and are connected to one another, whereby a heat transfer takes place. The sample gas is already heated in the connector block 2 and remains uniformly temperature-controlled via the gas path through the separation column 3 up into the detector 8. In contrast to the preceding exemplary embodiments, the heating elements 53 and temperature sensors 52, each electrical resistors here, are not arranged below but rather on the inside on the casing. Without the detector, the example shown measures only approximately 6 cm×6 cm×1 cm, and thus represents a particularly compact embodiment as a measuring unit for a particularly rapid gas chromatograph, which can be worn on the body, for example, as a warning device for toxic compounds in the respiratory air. The other exemplary embodiments, in contrast, enable a more sensitive and specific measurement as a measuring unit in a portable handheld device with larger dimensions and slower measurement. The first embodiments are also already significantly more compact and rapid than conventional measuring units in gas chromatographs. The last example shows the limits of this invention with respect to compactness and speed.

The invention claimed is:

1. A portable gas analysis device comprising a measuring unit that comprises:
   a detector;
   a separation column configured as a multi-capillary unit that comprises capillaries arranged in parallel in bent form;
   a casing enclosing the multi-capillary unit, the casing comprising a material having a thermal conductivity of at least 10 W/(m*K);
   a multi-connector block comprising a heat-conductive material, wherein the multi-connector block is attached to the casing and comprises connections for supply lines, exhaust lines, and the capillaries of the multi-capillary unit; and
   a thermal stabilization unit that comprises at least one temperature sensor and at least one heating element located on the casing.

2. The portable gas analysis device of claim 1, wherein the multi-capillary unit comprises capillaries wound in multiple turns.

3. The portable gas analysis device of claim 1, wherein the at least one heating element comprises multiple heating elements arranged on the casing such that the multi-capillary unit is temperature-controlled homogeneously.

4. The portable gas analysis device of claim 1, wherein the multi-capillary unit is anchored using a heat-conductive holder in the casing.

5. The portable gas analysis device of claim 4, wherein the heat-conductive holder is a heat-conductive adhesive.

6. The portable gas analysis device of claim 1, wherein the casing encloses the multi-capillary unit in a ring shape on both sides.

7. The portable gas analysis device of claim 6, wherein a control electronics unit of the portable gas analysis device is arranged in an interior of the ring-shaped casing.

8. The portable gas analysis device of claim 1, wherein the casing is formed trough-like in cross section and is closed by a removable cover.

9. The portable gas analysis device of claim 1, wherein the casing is enclosed using thermally insulating material.

10. The portable gas analysis device of claim 1, wherein the multi-connector block has an internal gas path system.

11. The portable gas analysis device of claim 10, wherein the connections of the multi-connector block comprise external connections for a sample gas supply line and a gas exhaust line and internal connections for ends of the multi-capillary unit.

12. The portable gas analysis device of claim 1, wherein the multi-connector block has a receptacle for the detector.

13. The portable gas analysis device of claim 12, wherein the multi-connector block comprises a second receptacle for a separate detector.

14. The portable gas analysis device of claim 1, wherein the detector comprises a photoionization detector, a mass spectrometer, a thermal conductivity detector, or a semiconductor gas detector.

15. The portable gas analysis device of claim 1, wherein the multi-connector block has two parts, wherein a beginning of the capillaries is arranged in a first part and an end of the capillaries is arranged in a second part.

16. The portable gas analysis device of claim 1, wherein a separate detector is provided on the multi-connector block.

17. The portable gas analysis device of claim 16, wherein a first gas path leads from an inlet for sample gas on a housing of the portable gas analysis device to the separate detector on the multi-connector block and a second gas path leads from the inlet for sample gas through the separation column up to the detector, wherein switching a valve determines whether in a first mode, a part of the second gas path in the multi-connector block has flow during injection in a direction of the separation column or in a second mode, the part of the second gas path is flushed in the opposite direction using carrier gas filtered in a filter.

18. The portable gas analysis device of claim 16, wherein the multi-connector block has two parts, wherein a beginning of the capillaries is arranged in a first part and an end of the capillaries is arranged in a second part, and wherein the seeker detector is arranged on the first part of the multi-connector block.

19. The portable gas analysis device of claim 1, wherein the measuring unit has a volume of at most 0.5 L.

20. The portable gas analysis device of claim 19, wherein the measuring unit has a volume of at most 0.25 L.

21. The portable gas analysis device of claim 1, wherein the casing is installed on a circuit board.

22. The portable gas analysis device of claim 21, wherein the circuit board is a printed circuit board that comprises a control electronics unit.

23. The portable gas analysis device of claim 22, wherein the thermal stabilization unit comprises multiple heating elements, multiple temperature sensors, or both.

24. The portable gas analysis device of claim 23, wherein the multiple heating elements, multiple temperature sensors, or both are spatially distributed on the casing between the circuit board and the casing.

25. The portable gas analysis device of claim 1, wherein the device is configured as explosion protected, intrinsically safe, or both.

26. The portable gas analysis device of claim 1, wherein the measuring unit comprising the separation column and the detector is embodied as a separate, replaceable assembly.

27. The portable gas analysis device of claim 1, wherein the device is configured for analyzing volatile compounds.

28. The portable gas analysis device of claim 1, wherein the material of the casing is metallic.

29. A measuring unit for a portable gas analysis device, the measuring unit comprising:
   a detector;
   a separation column embodied as a multi-capillary unit that comprises capillaries arranged in parallel in bent form;
   a casing enclosing the multi-capillary unit on the inside and outside, wherein the casing comprises a heat-conductive material;
   a multi-connector block comprising a heat-conductive material, wherein the multi-connector block is attached to the casing and comprises external connections for at least one sample gas supply line and at least one gas exhaust line and internal connections for the capillaries of the multi-capillary unit; and
   a thermal stabilization unit that comprises a temperature sensor and a heating element located on the casing.

* * * * *